US009350460B2

(12) United States Patent
Paik (10) Patent No.: US 9,350,460 B2
(45) Date of Patent: May 24, 2016

(54) SYSTEM AND METHOD FOR QUANTUM INFORMATION TRANSFER BETWEEN OPTICAL PHOTONS AND SUPERCONDUCTIVE QUBITS

(71) Applicant: RAYTHEON BBN TECHNOLOGIES CORP., Cambridge, MA (US)

(72) Inventor: Hanhee Paik, Cambridge, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 426 days.

(21) Appl. No.: 13/868,846

(22) Filed: Apr. 23, 2013

(65) Prior Publication Data
US 2014/0314419 A1  Oct. 23, 2014

(51) Int. Cl.
*H04B 10/00* (2013.01)
*H04B 10/70* (2013.01)
*H04B 10/2575* (2013.01)
*G06N 99/00* (2010.01)
*B82Y 10/00* (2011.01)

(52) U.S. Cl.
CPC ............... *H04B 10/70* (2013.01); *B82Y 10/00* (2013.01); *G06N 99/002* (2013.01); *H04B 10/2575* (2013.01)

(58) Field of Classification Search
CPC ..................... H04B 10/70; H04B 10/2575
See application file for complete search history.

(56) References Cited

U.S. PATENT DOCUMENTS 7,889,992 B1 *  2/2011  DiVincenzo ......... G06N 99/002
                                                      398/115
2003/0063426 A1   4/2003  Smirnov et al.

OTHER PUBLICATIONS

Strekalov et al., "Efficient upconversion of sub-THz radiation in a high-Q whispering gallery resonator", May 18, 2009, California Institute of Technology Opt. Lett. 34, pp. 1-3.*
Hafezi, et al., "Atomic Interface Between Microwave and Optical Photons", Physical Review A (Atomic, Molecular, and Optical Physics) American Physical Society USA, vol. 85, No. 2, Feb. 22, 2012 (pp. 020302/1-020302/5).
Liu, et al., "Coupling of a Single Diamond Nanocrystal to a Whispering-Gallery Microcavity: Photon Transport Benefitting From Rayleigh Scattering", Physical Review A (Atomic, Molecular, and Optical Physics) American Physical Society USA, vol. 84, No. 1, Jul. 25, 2011 (pp. 011805/1-011805/4).
Tsang, "Cavity Quantum Electro-Optics, II. Input-Output Relations Between Traveling Optical and Microwave Fields", Physical Review A (Atomic, Molecular, and Optical Physics) American Physical Society USA, vol. 84, No. 4, Oct. 27, 2011 (pp. 043845.1-043845.8).

(Continued)

*Primary Examiner* — Ken Vanderpuye
*Assistant Examiner* — David Lambert
(74) *Attorney, Agent, or Firm* — Lewis Roca Rothgerber Christie LLP (57) ABSTRACT

An electro-optical system for exchanging quantum information between optical qubits and including a superconductive microwave cavity; an electro-optical material; a superconductive qubit circuit formed on the electro-optical material including a superconductive qubit; a dipole antenna, formed on the electro-optical material for directly coupling the superconductive qubit to the superconductive microwave cavity; an optical input for receiving input optical photons; a microwave input for receiving input microwave photons; and an optical output for outputting modulated optical photons, wherein a frequency and a phase of the optical photon is modulated with a state of the superconducting qubit by the dipole antenna.

15 Claims, 10 Drawing Sheets

(56) References Cited

OTHER PUBLICATIONS

Extended European Search Report from European Application No. 14164911.1-1951, European Search Report dated Mar. 4, 2015 and mailed Mar. 17, 2015 (13 pgs.).

Abdo, Baleegh, et al.; "Full coherent frequency conversion between two microwave propagating modes"; dated Dec. 12, 2012; 21pp.

Flurin, E., et al.; "Generating Entangled Microwave Radiation Over Two Transmission Lines"; Physical Review Letters; 109; Nov. 2, 2012; 183901; 5pp.

Paik, Hanhee, et al.; "Observation of High Coherence in Josephson Junction Qubits Measured in a Three-Dimensional Circuit QED Architecture"; Physical Review Letters; 107; 240501; Dec. 9, 2011; 5pp.

Tsang, Mankei; "Cavity quantum electro-optics"; Physical Review; 81; 06837; 2010; 5pp.

Murata et al., "Electro-Optic Microwave-Lightwave Converter Using Antenna-Coupled Electrodes and Polarization-Reversed Structures", Lasers and Electro-Optics, 2008 and 2008 Conference on Quantum Electronics and Laser Science, IEEEXplore (2008) pp. 1-2.

Office action dated Jun. 8, 2015 from corresponding Canada application No. 2,849,589, filed Apr. 22, 2014 (4 pgs.).

\* cited by examiner

SYSTEM AND METHOD FOR QUANTUM INFORMATION TRANSFER BETWEEN OPTICAL PHOTONS AND SUPERCONDUCTIVE QUBITS

FIELD OF THE INVENTION

The present invention relates to a system and method for quantum information transfer between optical photons (qubits) and superconductive qubits.

BACKGROUND

Quantum information is physical information that is held in the state of a quantum system. The unit of quantum information may be a qubit, a two-level quantum system. In contrast to discrete classical digital states, a two-state quantum system can be in a superposition of the two states at any given time. Unlike classical information, quantum information cannot be read without the state being disturbed by the measurement device. Furthermore, in quantum information, an arbitrary state cannot be cloned.

Coherent states of light, such as those of laser light waveforms, are widely used for communication and sensing applications, so the optimal discrimination of coherent states, that is, the quantum states of light emitted by a laser, has immense practical importance. However, quantum mechanics imposes a fundamental limit on how well different coherent states can be distinguished, even with perfect detectors, and limits such discrimination to have a finite minimum probability of error. While conventional optical detection schemes lead to error rates well above this fundamental limit, an explicit receiver design involving feedback and photon counting that can achieve the minimum probability of error has been proposed.

A quantum computer makes direct use of quantum mechanical properties, such as superposition and entanglement, to perform operations on data. Contrary to digital computers, which require data to be encoded into binary digits (bits), quantum computers utilize quantum properties to represent data and perform operations on these data. Quantum computers share theoretical similarities with non-deterministic and probabilistic computers, like the ability to be in more than one state simultaneously. A quantum computer maintains a sequence of "qubits," each of which can represent a one, a zero, or any quantum superposition of these two qubit states. Additionally, a pair of qubits can be in any quantum superposition of 4 states, and three qubits in any superposition of 8.

A quantum computer operates by setting the qubits in a controlled initial state that represents the hypothesis at hand and by manipulating those qubits with a fixed sequence of quantum logic gates. The calculation may end with measurement of all the states, collapsing each qubit into one of the two pure states, so the outcome can be at most n classical bits of information. Alternatively, the qubits may be stored in a quantum memory for further quantum processing. However, quantum processing of qubits typically costly and challenging due to ever changing states of the qubits.

A charge qubit is a qubit with charged states and is formed by a small superconducting island (also known as a Cooper-pair box) coupled by a Josephson junction to a superconducting reservoir. The state of the charge qubit is determined by the number of Cooper pairs which have tunneled across the Josephson junction. The quantum superposition of charge states can be achieved by tuning a gate voltage that controls the chemical potential of the island. The charge qubit is typically read-out by electrostatically coupling the island to a sensitive electrometer such as a radio-frequency single-electron transistor.

A transmon is a type of superconducting charge qubit that is designed to have reduced sensitivity to charge noise via significantly increasing the ratio of the Josephson energy to the charging energy. This may be accomplished through the use of a large shunting capacitor, which results in energy level spacings that are approximately independent of offset charge.

Superconducting circuits are a promising technology for quantum information processing with solid-state devices. Several different types of qubits have been developed, which rely on the nonlinearity of one or more Josephson junctions. Ideally, the Josephson junctions should be dissipationless and highly stable to avoid decoherence, while providing the crucial anharmonicity that allows individual energy levels to be separately addressed. In the past decade, the coherence time of superconducting qubits has increased from initially only a few nanoseconds to typically about a microsecond today. This has permitted experiments where two or three qubits are controlled, entangled, and used to demonstrate simple algorithms. However, scaling more than three qubits with an acceptable level of fidelity and coherence requires higher coherence times than the current state of art.

The coherence can be limited by possible imperfections in the Josephson junctions or by unintended interactions with the environment. Even if the junctions were perfectly coherent, achieving a long coherence time also requires understanding and controlling the Hamiltonian such that the terms coupling the qubit to the outside world can be made small.

Quantum electrodynamics (QED) theory describes how light and matter interact and mathematically describes all phenomena involving electrically charged particles interacting by exchange of photons. In general, a circuit quantum electrodynamics (cQED) provides means to study the interaction between light and matter. For example, a single photon within a single mode cavity coherently couples to a quantum object (atom). In contrast to cavity QED, in cQED, the photon is stored in a one-dimensional on-chip resonator and the quantum object is no natural atom but an artificial one. These artificial atoms usually are mesoscopic devices which exhibit an atom-like energy spectrum.

The present invention utilizes superconducting qubits to exchange quantum information between optical qubits at telecommunication frequencies and superconducting qubits at microwave frequencies.

SUMMARY OF THE INVENTION

In some embodiments, the present invention is an electro-optical system for exchanging quantum information between optical qubits and superconducting qubits. The system includes a superconductive microwave cavity; an electro-optical material positioned inside of the superconductive microwave cavity; a superconductive qubit circuit formed on the electro-optical material including a superconductive qubit having two electrodes; a dipole antenna, formed on the electro-optical material by the two electrodes attached to a single Josephson junction, for directly coupling the superconductive qubit to the superconductive microwave cavity; an optical photon input for receiving input optical photons; a microwave photon input for receiving input microwave photons; and an optical photon output for outputting modulated optical photons, wherein a frequency and a phase of the optical photon is modulated with a state of the superconducting qubit by the dipole antenna.

In some embodiments, the present invention is a method for exchanging quantum information between optical qubits and superconducting qubits. The method includes receiving an optical photon via an optical fiber; storing the received optical photon in an optical cavity; receiving a microwave photon via a microwave input port; storing the received microwave photon in a superconducting qubit; directly coupling the received optical photon to a voltage at the superconducting qubit generated using the electro-optic effect of the optical cavity; modulating the frequency of the received optical photon by the direct coupling; and outputting the modulated optical photon in a fiber optic line.

In some embodiments, the present invention is a method for exchanging quantum information between optical qubits and superconducting qubits. The method includes receiving an optical photon via an optical fiber; storing the received optical photon in an optical cavity; receiving optical pump signals comprising of a plurality of optical photons at frequency $\omega_s+\omega_b$; activating an electro-optic effect between an optical cavity formed by an electro-optical material at frequency $\omega_a$ and a superconducting qubit at $\omega_b$, by the received optical pump signals converting the received optical photons at frequency $\omega_a+\omega_b$ into an entangled pair of the optical photon at frequency $\omega_a$ and the superconducting qubit at $\omega_b$; and outputting the entangled pair via an optical output port.

In some embodiments, the present invention is a method for exchanging quantum information between optical qubits and superconducting qubits. The method includes receiving a microwave photon at frequency $\omega_b$ via microwave ports through a superconducting microwave cavity; storing the received microwave photon at frequency Ob in a superconducting qubit; receiving optical pump signals comprising of a plurality of optical photons at frequency $\omega_a-\omega_b$; activating an electro-optic effect between an optical cavity formed by an electro-optical material at frequency $\omega_a$ and a superconducting qubit at $\omega_b$, by the received optical pump signals converting the received microwave photon at frequency $\omega_b$ into an optical photon at frequency $\omega_a$ using the optical pump at frequency $\omega_a-\omega_b$; and outputting the optical photon at frequency $\omega_a$ via an optical output port.

The electro-optical material may be in a shape of a circular disk and may comprise of Lithium Niobate.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention is directed to a method and an electro-optic system which can exchange quantum information between optical qubits at frequencies ranging from infrared to ultraviolet and superconducting qubits at microwave frequencies between DC to a few hundred GHz. In some embodiments, the present invention uses high-Q superconducting qubits (for example, three-dimensional (3D) qubits) fabricated on a nonlinear electro-optic (EO) material that forms a high-Q whispering gallery optical cavity. The use of such superconducting qubits allows an order of magnitude improvement in the achievable coherent coupling rate over previous proposals that use parallel-plate capacitors or coplanar waveguides. The stronger coupling according to the present invention translates directly into fast exchange of information, which is critical to high-fidelity quantum operations.

There are several advantages to using superconducting qubits in direct coupling to the optical qubits. First, the superconducting qubit can be prepared in its quantum ground state without additional cooling process using laser or microwave. Second, in addition to the optical control, the quantum state of the superconducting qubit can be separately and precisely controlled and read out by microwave electronics, unlike other alternatives, such as nanomechanical oscillators, a submicron mechanical structure that uses a state of its mechanical motions as quantum-bits. Third, superconducting qubits are easily scalable compared to other technologies (e.g. using atomic gases or molecules) in recent proposals. The direct coherent conversion between the optical and the superconducting qubits provides more efficient quantum information transfer than the multistage conversion processes with intermediate steps such as nanomechanical oscillators.

The novel electro-optic system and the corresponding method of the present invention enable key quantum applications. For example, distributed quantum computing, quantum repeaters for long-distance quantum key distribution and minimum probability of error optical receivers may be realized using the method and system of the present invention. Furthermore, it enables networked processing applications such as quantum privacy algorithms. A quantum repeater which needs to map flying qubits to stationary memory qubits and back allows secure quantum communication over distances greatly exceeding the ~100 km limits today. Additionally, quantum processing for optimal receivers can be made practical with the use of superconducting qubits. By directly transferring quantum information between optical and microwave, the invention can utilize the strong non-linearity in superconducting qubits not present at optical frequencies and take advantage of precise quantum control with microwave electronics.

The method and system of the present invention allow entanglement between remote superconducting qubits connected via optical fiber and entanglement based quantum information processing, such as teleportation.

Figure 1:
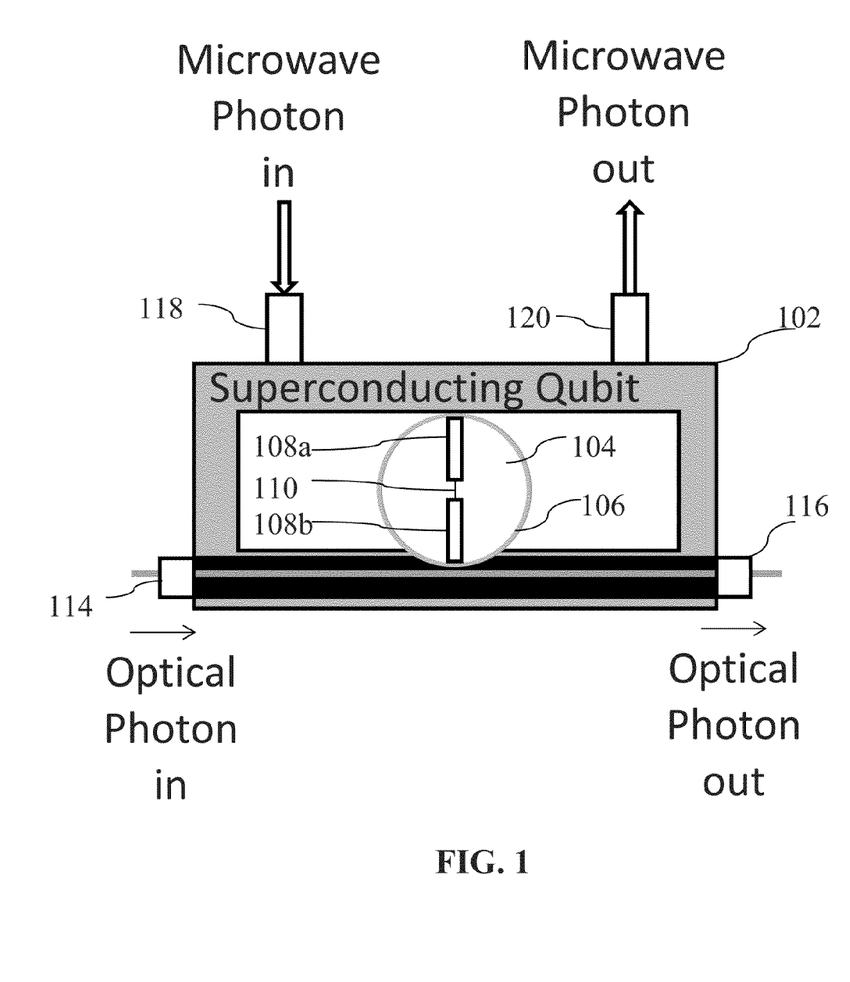
FIG. 1 is a block diagram of an exemplary electro-optic system, according to some embodiments of the present invention.

FIG. 1 is a block diagram of an exemplary electro-optic system, according to some embodiments of the present invention. In some embodiments, the electro-optic system of the present invention is a system of a whispering-gallery mode (WGM) optical cavity that is made of an EO material and a superconducting qubit. Whispering-gallery modes are a type of wave that can travel around a concave surface and can exist for light and for other waves, with applications in nondestructive testing, lasing, cooling and sensing.

In some embodiments, a simple transmon qubit comprising of two superconducting electrodes is connected with a single small aluminum Josephson junction, that requires no bias circuitry and has minimal sensitivity to low-frequency noises in charge or flux, coupled to a microwave resonant cavity that can act as an entanglement bus and readout circuit. Neglecting the interactions with its environment, the transmon is described by the simple Hamiltonian $$[9,11] \hat{H} = 4E_C(\hat{n} - n_o)^2 - E_J \cos \hat{\phi}$$

Where $\hat{n}$ and $\hat{\phi}$ are the normalized operators for the pair charge and phase (obeying $[\hat{\phi}, \hat{n}] = i$), $E_J = \hbar I_c/2e$ and $E_C = e^2/2C_\Sigma$ are the Josephson and Coulomb energies, e is the electron's charge, $I_c$ is the junction critical current, $C_\Sigma$ is the total capacitance between the electrodes, and $n_o$ is the offset charge.

In some embodiments, the EO material is shaped into a circular disk which accommodates whispering gallery modes at multiple frequencies. As shown in FIG. 1, a superconducting microwave cavity 102 includes an ingress optical port 114 for receiving optical photons (qubits), and an egress optical port 116 for outputting modulated optical photons (qubits) via the optical fiber 112. The superconducting microwave cavity 102 also includes an ingress microwave port 118 for receiving microwave photons (qubits), and an egress microwave port 120 for outputting microwave photons (qubits). The superconducting qubit is coupled to the superconducting microwave cavity 102 through a broadband dipole antenna.

In some embodiments, the dipole antenna is formed by two rectangular electrodes 108a and 108b attached to a single Josephson junction which is a part of superconducting circuits 110. The antenna is used to receive and emit microwave photons from/to the superconducting microwave cavity 102. The microwave photons may be used to manipulate and measure the states of the superconducting qubits or to correct errors. The microwave photons may be generated by an external source (not shown) that operates at room temperature. One or more EO materials are positioned within the superconducting microwave cavity 102 that include superconducting qubit circuits 108a, 108b and 110. The EO material 104 forms an optical cavity. The optical photons (qubits) 116 are stored (accumulated) in the EO material optical cavity 104. In some embodiments, the dipole antenna is 1 mm long. In some embodiments, the superconducting microwave cavity 102 is made of aluminum or a mixture of aluminum and other superconducting or metallic material.

This way, higher coupling g between optical and microwave photons is achieved with a smaller capacitor from superconducting qubit. In some embodiments, the capacitor of superconducting qubit is formed between two rectangular electrodes 108a and 108b with the EO material 104 as a dielectric medium of the capacitor where electric fields are stored. Even higher coupling g may be achieved with alternative EOMs, for example, barium titanate.

The superconductive qubit circuits are built on optical cavity made of EO material and store both optical photons and most of superconducting qubit's electric field (E-field) energy. This E-field energy, which can be represented as microwave photons, are electromagnetic standing waves that induce birefringence in the EO material such that they modulate frequencies and phases of optical photons stored in the EO material optical cavity. Since the E-field energy changes depending on the state of the superconducting qubits, frequencies and phases of optical photons are modulated with the state of superconducting qubits.

Scaling this architecture to multiple qubits is not harder than for conventional superconducting circuits. For example, more qubits can be added inside a cavity such that they couple to each other.

Figure 2A:
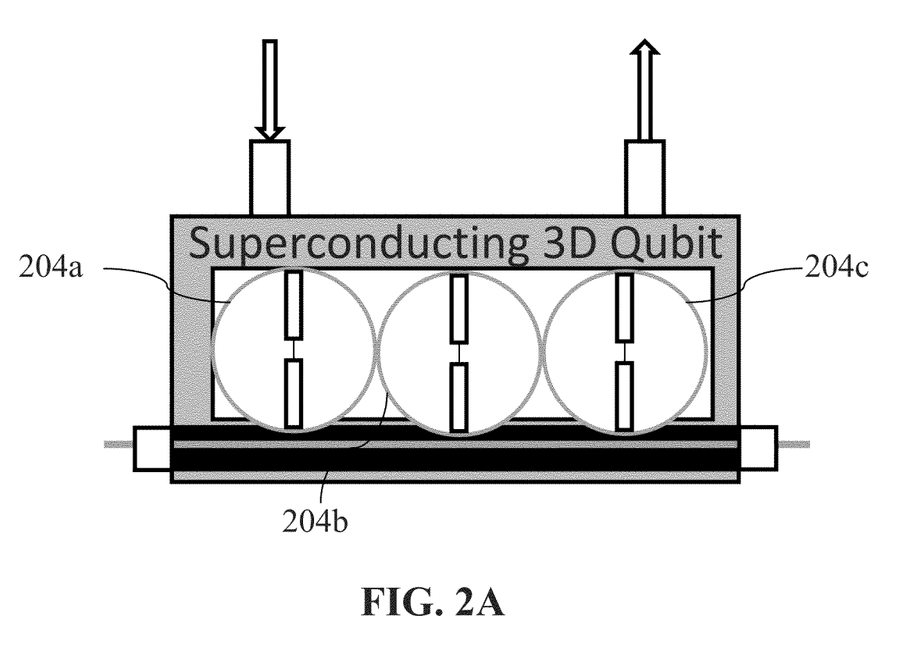
FIGS. 2A-2C show various embodiments for configuration of electro-optic systems, according to some embodiments of the present invention.
Figure 2B:
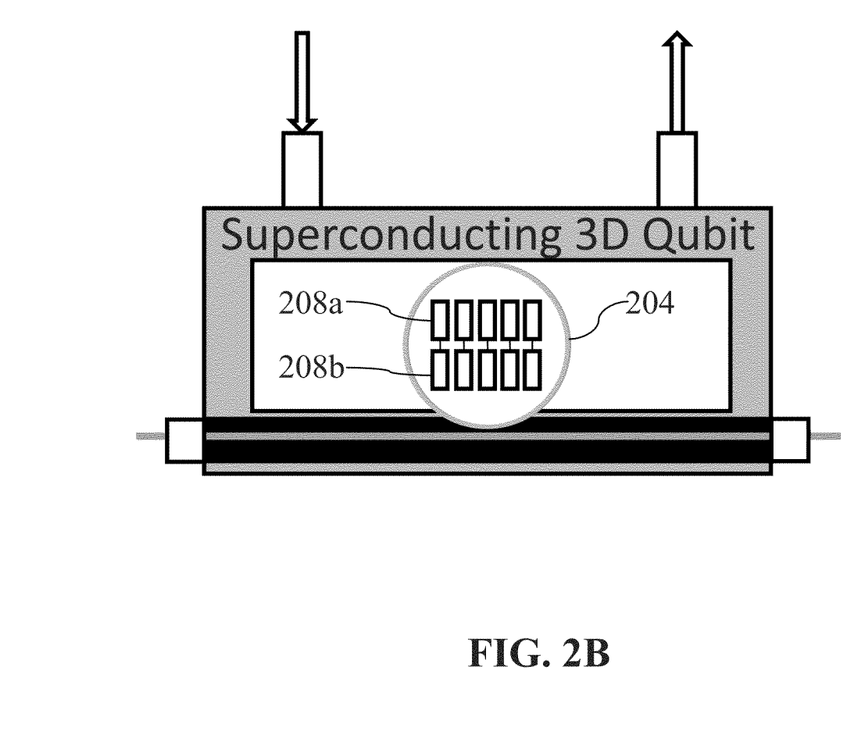
Figure 2C:
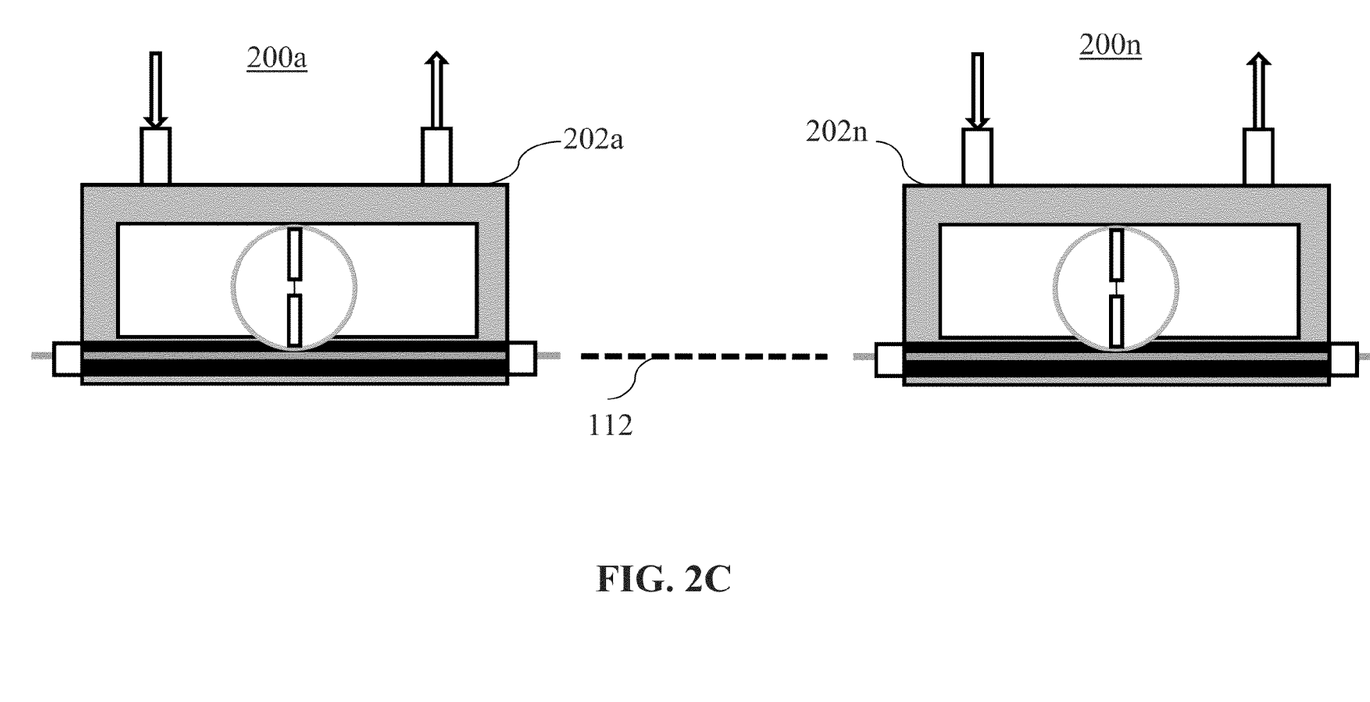

FIGS. 2A-2C show various embodiments for configuration of electro-optic systems, according to some embodiments of the present invention. As shown in FIG. 2A, multiple optical cavities with disk-shaped EO materials 204a-204c are included in the superconducting microwave cavity. Each of these EO materials may include a different superconducting qubit circuits or the same superconducting qubit circuits as the other EO material optical cavities. This allows for scalability of the system/circuits by adding more superconducting circuits using additional EO materials 204a-204c. As depicted in FIG. 2B, a single EO material optical cavity 204 is used. However, the EO material 204 includes multiple superconducting qubit circuits, for example, two rows of multiple superconductive qubit circuits 208a and 208b. It is still within the scope of the invention to include multiple EO material cavities 204a-204c (similar to those in FIG. 2A), but each multiple EO material having multiple circuits, similar to those shown in FIG. 2B.

FIG. 2C illustrates multiple electro-optic systems 200a-200n (including EO material optical cavities 202a-202n) optically coupled via the optical fiber 112. Each of these multiple electro-optic systems 200a-200n may have a configuration as those in FIG. 2A, FIG. 2B or a combination thereof. This architecture may be used for distributed quantum processing by distributed multiple electro-optic systems 200a-200n. Distributed quantum computation across multiple processors, interconnected through optical fibers, greatly enhances the size of quantum algorithms which can be performed as the community develops initially small scale quantum processors to larger scale. This architecture may be also used for a quantum repeater that enables to send quantum information via long distance through multiple quantum repeaters, which allows secure quantum communication over distances greatly exceeding the ~100 km limits today.

Figure 3A:
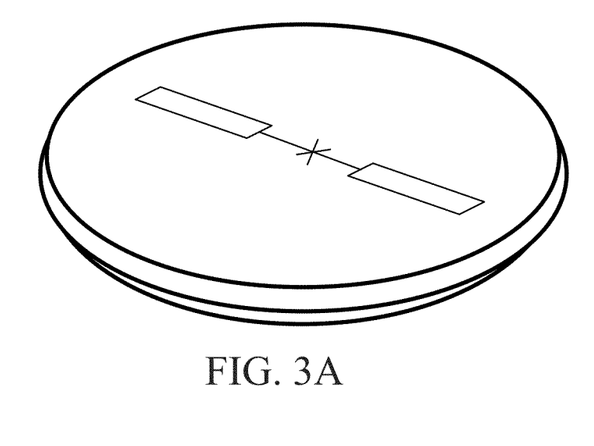
FIGS. 3A-3C show different views of an exemplary electro-optical material, according to some embodiments of the present invention.
Figure 3B:
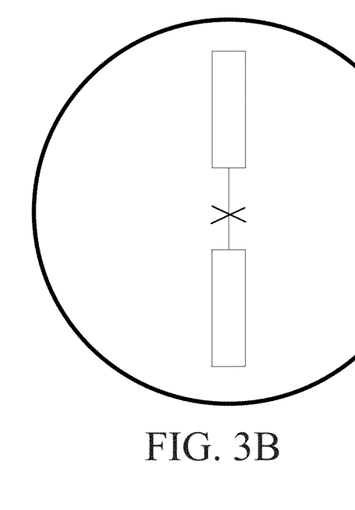
Figure 3C:
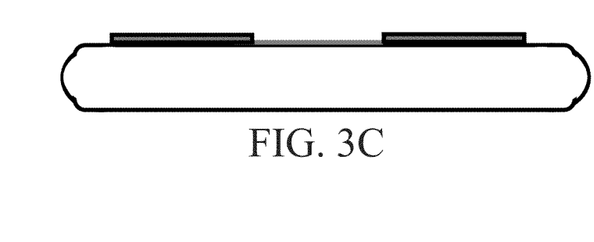

FIGS. 3A-3C show different views of an exemplary electro-optical material, according to some embodiments of the present invention. FIG. 3A shows a whispering gallery mode (WGM) optical cavity that is made of an EO material with a superconducting 3D qubit in perspective view. In this example, the EO material WGM optical cavity is shaped as a disk with a thickness ranging from a few microns to hundreds of microns and a 3D qubit with a dipole antenna is fabricated on the surface of the EO material WGM optical cavity. The dipole antenna is used to receive and emit microwave photons from/to a superconducting microwave cavity where this EO material WgM optical cavity with a 3D qubit are located. The symbol "X" denotes a circuit representation of a Josephson junction for superconducting qubit. FIG. 3B shows a top view of the EO material WGM optical cavity with the 3D qubit. FIG. 3C shows a side view of the EO material WGM optical cavity. In some embodiments, the side of the cavity is polished such that the side profile is rounded to accommodate whispering-gallery modes.

Figure 4A:
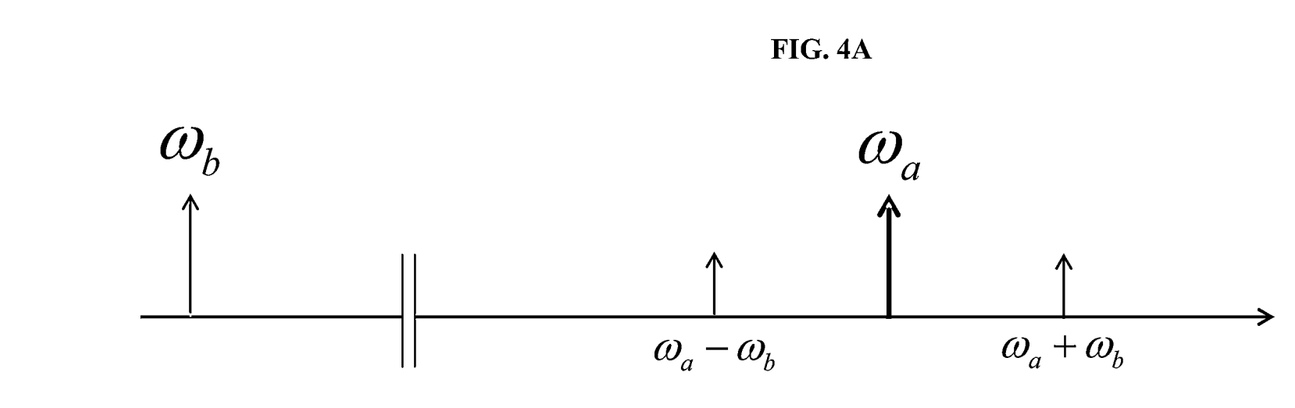
FIGS. 4A-4C show an exemplary frequency spectrum of electro-optic system, according to some embodiments of the present invention.
Figure 4B:
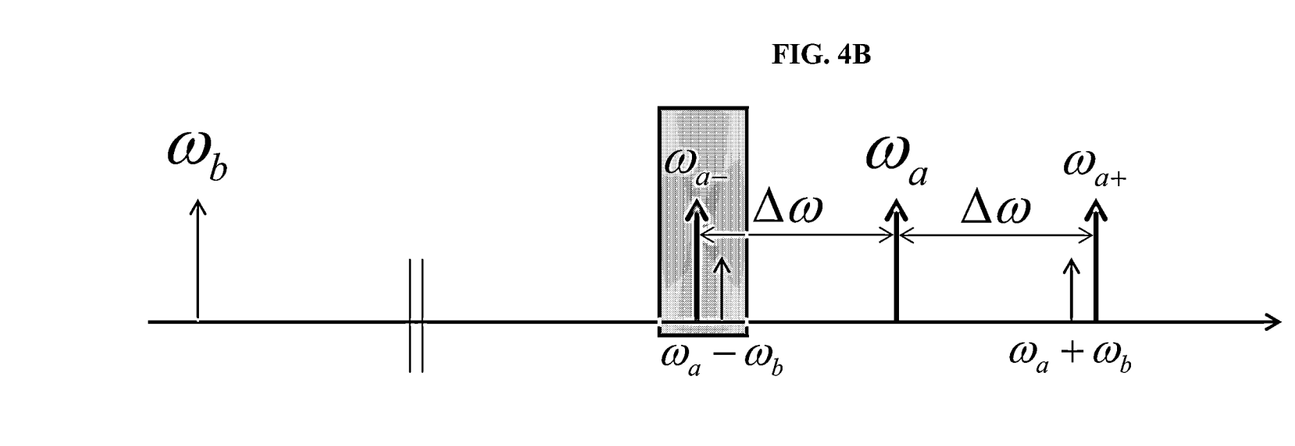
Figure 4C:
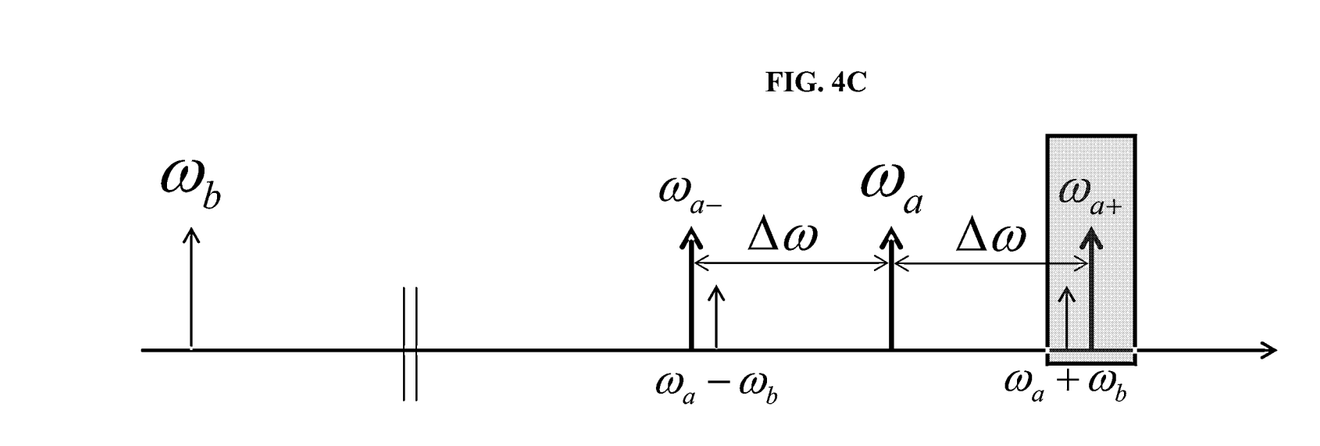

FIGS. 4A-4C show an exemplary frequency spectrum of electro-optic system, according to some embodiments of the present invention. Arrows in FIG. 4A indicate resonance frequencies of three optical modes ($\omega_a - \omega_b$, $\omega_a + \omega_b$) and superconducting qubit ($\omega_b$). The resonances at $\omega_a - \omega_b$ and $\omega_a + \omega_b$ are called sidebands where red sideband is $\omega_a - \omega_b$ and blue sideband is $\omega_a + \omega_b$. In some embodiments, EO material WGM optical cavity are engineered to have three optical modes at frequencies $\omega_{a-}=\omega_a-\Delta\omega$, $\omega_a$, $\omega_{a+}=\omega_a+\Delta\omega$ and $\Delta\omega\sim\omega_b$, as shown in FIGS. 4B and 4C. When the state of superconducting qubit changes, the change of the state generates a microwave photon at $\omega_b$ which modulates the frequency of the optical photon at $\omega_a$ to $\omega_a-\omega_b$ or to $\omega_a+\omega_b$. With the condition of $\Delta\omega\sim\omega_b$, this modulation enables swap of quantum states between optical qubits at $\omega_a\sim\omega_b$ and $\omega_a$ enclosed in a red box in FIG. 4B or between optical qubits at $\omega_a+\omega_b$ and $\omega_a$ enclosed in a blue box in FIG. 4C. Using this swap operation, an entangled pair of optical qubit at $\omega_a$ and superconducting qubit at $\omega_b$ is generated.

Figure 5:
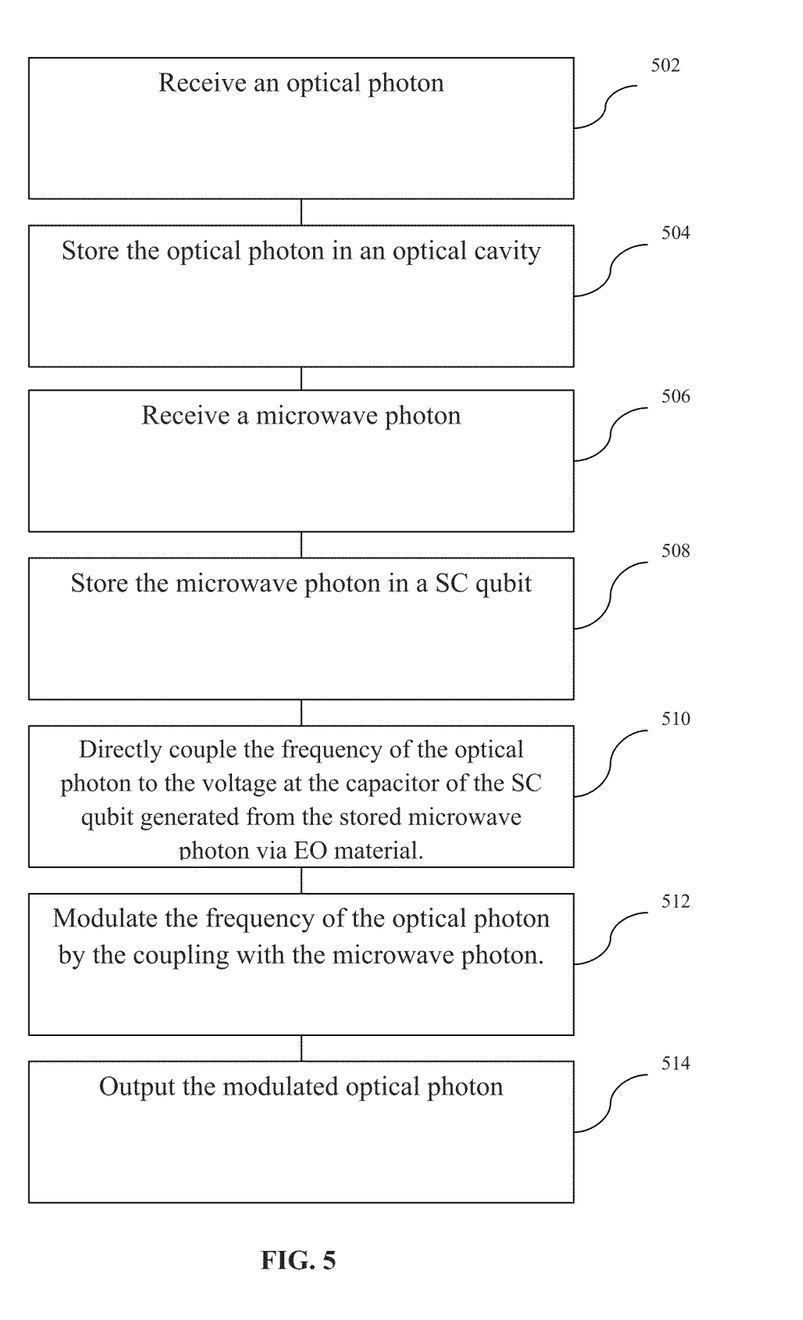
FIG. 5 is an exemplary process flow, according to some embodiments of the present invention.

FIG. 5 is an exemplary process flow, according to some embodiments of the present invention. As shown in block 502, optical photon is received, for example, via the optical port 114 and fiber 112 of FIG. 1. In block, 504, the received optical photon is then stored in an optical cavity, for instance, the optical cavity formed by the EO material 104 in FIG. 1. In block 506, microwave photon is received, for example, via the ingress microwave port 118 of FIG. 1. The received microwave photon is then stored in a superconducting qubit, for instance, the superconducting qubit circuit 108a, 108b, and 110 in FIG. 1. The frequency of the optical photon is directly coupled to the voltage at the capacitor of the SC qubit generated from the storing of the microwave photon from the SC qubit via electro-optic effect of the EO material optical cavity, in block 510.

In block 512, the frequency of the optical photon is modulated by the direct coupling of the optical photon and the superconducting qubit via electro-optic effect of the EO material optical cavity. In block 514, the modulated optical photon is outputted via the optical output port 116. The modulated optical photon carries quantum information of the superconducting qubit obtained from the microwave photon via the modulation and the electro-optic effect and can transfer the quantum information via long distance.

Figure 6:
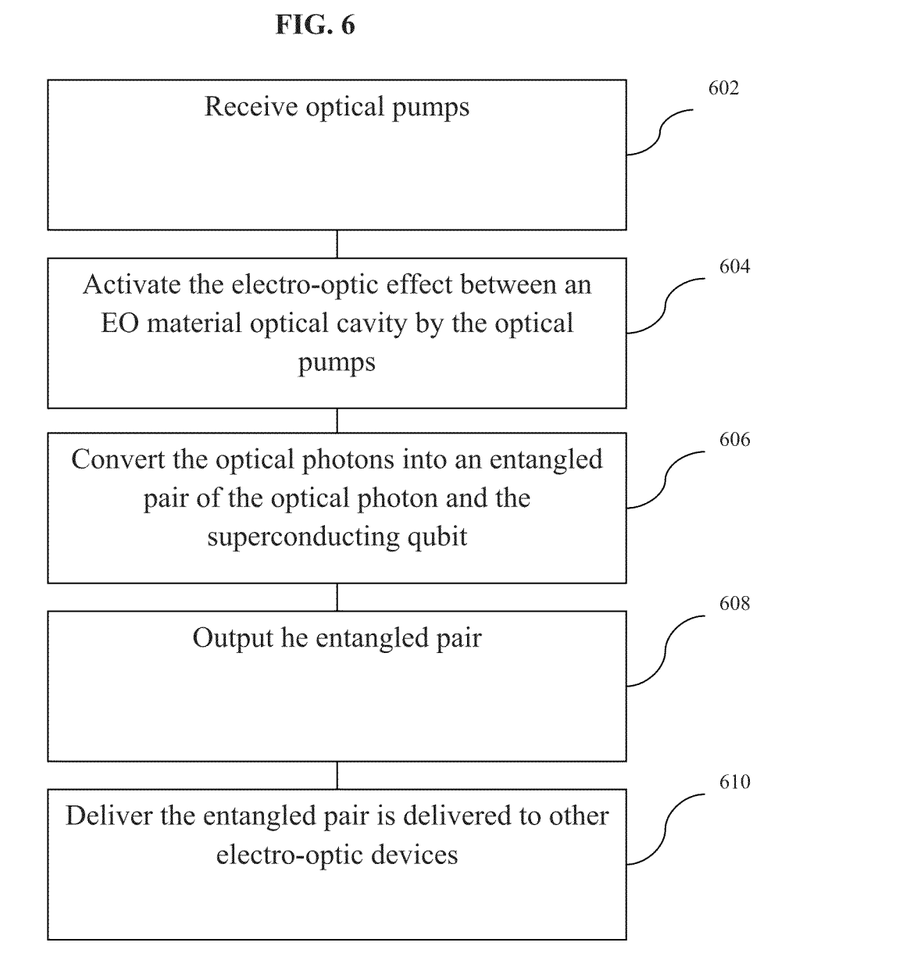
FIG. 6 is an exemplary process flow, according to some embodiments of the present invention.

FIG. 6 is an exemplary process flow, according to some embodiments of the present invention. Optical pump signals which comprise of many optical photons at frequency $\omega_a+\omega_b$ are received and stored in EO material optical cavity 104 in FIG. 1, for example, via optical input port 114 shown in FIG. 1, in block 602. In block 604, the optical pump signals activate the electro-optic effect between an EO material optical cavity at frequency $\omega_a$ and a superconducting qubit at $\omega_b$. In block 606, Optical photons at frequency $\omega_a+\omega_b$ are converted into an entangled pair of the optical photon at frequency $\omega_a$ and the superconducting qubit at $\omega_b$. In block 608, the entangled pair is outputted, for example, via the optical output port 116 shown in FIG. 1. The entangled pair is delivered to other electro-optic device via optical fiber, for example, as shown in FIG. 2C or FIG. 7.

Figure 7:
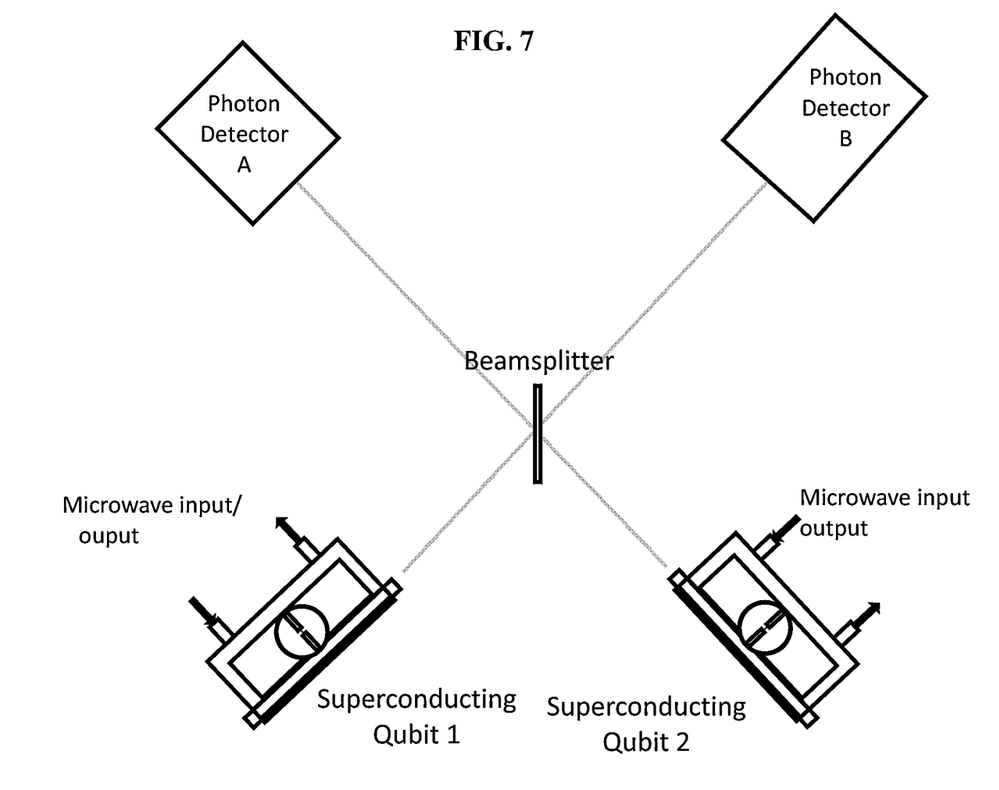
FIG. 7 shows an exemplary set up for a quantum repeater, according to some embodiments of the present invention.

FIG. 7 shows an exemplary set up as a quantum repeater where an entangled pair of optical and superconducting qubit can be generated by the present invention and distributed for the purposes of distributed quantum computing and long distance quantum communication, according to some embodiments of the present invention. FIG. 7 illustrates a schematic representation of an exemplary way that the present invention can be setup to create an entangled pair of optical and superconducting qubits in the device and transfer the quantum information via the optical qubit to distribute the entanglement. As shown, the entanglement distribution is set up with the electro-optic system using the 3D superconducting qubit and EO material optical cavity.

The optical qubits are entangled with the superconducting qubits in each device (1 and 2) through a three-wave mixing with a pump tone. The optical qubits that are entangled with the superconducting qubits in each device (1 and 2) are sent via optical fibers to the beam splitter where the two optical qubits are entangled again with each other. This entanglement of optical qubits at the beam splitter entangles two superconducting qubits remained in each devices and detects the creation of the entanglement between the superconducting qubits in each device. The entangled optical qubits are entangled and split at the beam splitter and are sent to the photon detectors (A and B). The creation of the entanglement between two superconducting qubits 1 and 2 is heralded by the detection of the optical qubits at the photon detectors, A and B, respectively. In some embodiments, the diameter of the disk is chosen so that there are three modes at frequencies of $\omega_{op}-\omega_q$ (red sideband), $\omega_{op}$ (carrier) and $\omega_{op}+\omega_q$ (blue sideband) that are separated by the frequency of the superconducting qubit. Here, $\omega_{op}/2\pi$ is in the optical frequency range around 193 THz (for example, 1550 nm wavelength) and $\omega_q/2\pi$ is the resonance frequency of the superconducting qubit in the microwave domain (for example, ~10 GHz). With these sideband modes, the system of an EO material optical cavity and a superconducting qubit (FIG. 1) acts as a three-wave mixer that couples optical and microwave photons, which perform amplification and frequency conversion. With strong optical photons applied at the blue-sideband frequency, the invention can amplify or entangle the incident optical and microwave photons. With strong optical photons applied at the red-sideband frequency, the invention can convert the incident microwave photons into optical photons or vise-versa, without any gain. These operations of a three-wave mixer have been recently demonstrated in the microwave domain using a Josephson parametric converter (JPC). (See, for example, B. Abdo, et al. arXiv:1212.2231 (2012), and E. Flurin et al. Phys. Rev. Lett. 109, 183901 (2012)).

In some embodiments, the use of superconducting qubits potentially allows achieving an order of magnitude stronger coupling compared to the previous methods using only microwave cavities, without the additional complexity of a mediating resonator (e.g. nano-mechanical oscillators). The stronger coupling is achieved by the small capacitance of the superconducting qubit. The coupling strength is given as $$g = v_{ZPF} \partial \omega_{op} / \partial V \quad (1)$$

where $$V_{ZPF} = \sqrt{\hbar \omega_q / 2C}$$

is a zero-point voltage fluctuation of the superconducting qubit with an energy $\hbar\omega_q$ and a capacitance C, $\omega_{op}$ is the angular frequency of the optical photon and V cis the voltage induced on the EO material by the superconducting qubit. The superconducting qubit capacitance can be about 100 times smaller than a microwave capacitor of the size of the EO material substrate. Using typical parameters of an EO material (for example, Lithium Niobate, or LiNbO$_3$) and a superconducting qubit, the coupling strength g is estimated to be as high as 10 kHz, that is, an order of magnitude larger than the most optimistic estimation with a microwave resonator, as suggested by M. Tsang (M. Tsang, Phys. Rev. A 81, 063837 (2010)).

In some embodiments, lithium niobate (LiNbO$_3$) is selected as for the EO material to build the electro-optic system. LiNbO$_3$ is one of the most popular EO materials which is commercially available. However, its cryogenic properties at dilution refrigerator temperature are rarely studied. The relevant cryogenic properties of LiNbO$_3$ including cryogenic microwave-loss, piezoelectricity and pyroelectricity at dilution refrigerator temperature are investigated. To measure these properties, an ultra-high-Q cylindrical/rectangular microwave superconducting cavity is used, where a disk of $LiNbO_3$ is inserted as a part of dielectric material in the cavity. The upper bound of the microwave loss and the permittivity is then estimated by measuring the quality factor and the frequency shift of the cavity with and without $LiNbO_3$. Once the upper bounds are determined, a 3D qubit on a $LiNbO_3$ wafer is fabricated to evaluate the coherence time of the qubit.

The cryogenic piezoelectricity and pyroelectricity of the EO material can be tested by measuring the coherence times of the superconductive qubit fabricated on the EO material (e.g., $LiNbO_3$) wafer. These two properties produce electric charges on the EO material (e.g., $LiNbO_3$) surface. Since the superconducting qubits are made of a Josephson tunnel junction whose junction barrier is a thin metal oxide, large electric charges across the junction can break the oxide barrier and destroy the qubit.

The optical setup of the electro-optical system, including the optical fiber and WGM cavity, can be tested at dilution refrigerator temperature, using a measurement setup similar to that shown in FIG. 1. In the test set up, the line width should be smaller than the frequency of the superconducting qubits (resolved sideband regime) to demonstrate the coherent coupling. In addition, the quality factor should be high enough to prevent large quasiparticle generation induced by optical photon leakage into the superconducting qubit which reduces the coherence times of the qubit. However, it has been shown that the quality factor (Q) of a $LiNbO_3$ WGM cavity can be as high as $10^8$.

Moreover, to demonstrate the frequency conversion, the superconducting qubit is driven at $\omega_q$ to induce Rabi-oscillations between the ground and excited state and monitor the excited state population while applying optical photons at the red-sideband frequency, $\omega_{op}-\omega_q$ as a "pump". The process can be intuitively understood as the microwave photon at $\omega_q$ is combined with the red-sideband optical photon at $\omega_{op}-\omega_q$ to produce the carrier optical photon at $\omega_{op}$. The conversion effect is observed as a decrease of the excited state population. The steady-state excited state population is governed by the optical pump power, the coupling strength and the decay rates of the WGM cavity and the superconducting qubit. The ratio of the steady-state excited state population of the superconducting qubit is then measured with and without the optical pump to determine the conversion efficiency.

The coupling strength g, which may reach up to ~10 kHz, can be measured directly by measuring the frequency shift of the optical photons due to the superconducting qubit. The transmission of the WGM optical cavity is monitored while applying a CW optical tone. When the qubit in the excited state is prepared with a π pulse, the frequency shift of the optical cavity response caused by the qubit transition can be measured. The coupling strength g, can be also measured by demonstrating optical cooling. The superconducting qubit may be driven at $\omega_q$ to induce Rabi-oscillations between the ground and excited state and monitor the excited state population decay while applying a pump at the red-sideband frequency, $\omega_{op}-\omega_q$. The process can be intuitively understood as the microwave photon at $\omega_q$ being combined with the red-sideband optical photon at $\omega_{op}-\omega_q$ to produce the carrier optical photon at $\omega_{op}$. The conversion effect is then observed as a decrease of the excited state population. The steady-state excited state population is governed by the optical pump power, the coupling strength g and the decay rates of the WGM cavity and the superconducting qubit. The coupling strength g can be inferred from optical cooling rate of the superconducting qubit.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. An electro-optical system for directly exchanging quantum information between optical qubits and superconducting qubits comprising:
  a superconducting microwave cavity;
  an electro-optic material positioned inside of the superconductive microwave cavity for directly coupling optical photons to the superconducting qubits;
  a superconducting qubit circuit formed on the electro-optic material including a 3-dimensional (3D) superconducting qubit having two electrodes;
  a dipole antenna, formed on the electro-optical material by the two electrodes attached to the superconducting qubit circuit and including a Josephson junction, for directly coupling the 3D superconducting qubit to the superconducting microwave cavity;
  an optical photon input for receiving input optical photons;
  a microwave photon input for receiving input microwave photons;
  a microwave photon output for outputting microwave photons; and
  an optical photon output for outputting optical photons that are entangled with the 3D superconducting qubit or that are modulated by a state of the 3D superconducting qubit to directly transfer quantum information between optical and microwave photons.

2. The electro-optical system of claim 1, wherein the electro-optical material is in a shape of a circular disk and is configured to accommodate whispering gallery modes at multiple frequencies.

3. The electro-optical system of claim 2, wherein the electro-optic material forms an optical cavity.

4. The electro-optical system of claim 1, wherein the superconducting microwave cavity comprises superconducting material.

5. The electro-optical system of claim 1, wherein the input microwave photons are generated by a microwave source.

6. The electro-optical system of claim 1, further comprising an optical fiber for carrying the input optical photons and the modulated optical photons.

7. The electro-optical system of claim 1, further comprising a plurality of electro-optical materials each shaped as a circular disk and positioned inside of the superconductive microwave cavity.

8. A method for directly exchanging quantum information between optical qubits and superconducting qubits, the method comprising:
  receiving an optical photon via an optical fiber,
  storing the received optical photon in an optical cavity;
  receiving a microwave photon via a microwave input port;
  storing the received microwave photon in a 3-dimensional (3D) superconducting qubit;
  directly coupling the received optical photon to a voltage at the 3 superconducting qubit using an electro-optic effect of the optical cavity;

modulating a frequency of the received optical photon by the direct coupling; and outputting the modulated optical photon in a fiber optic line to directly transfer quantum information between said optical photon and said microwave photon.

9. The method of claim 8, wherein the superconducting qubit is formed on an optical cavity that is made of electro-optical material.

10. The method of claim 8, wherein the superconducting microwave cavity comprises superconducting material.

11. The method of claim 8, further comprising receiving the modulated optical photon via the fiber optic line for further quantum processing of the modulated optical photon.

12. A method for directly exchanging quantum information between optical qubits and superconducting qubits, the method comprising:

receiving optical pump signals comprising a plurality of optical photons, at a frequency of $\omega_a + \omega_b$;

activating an electro-optic effect between an optical cavity formed by an electro-optical material at a frequency of $\omega_a$ and a 3-dimensional (3D) superconducting qubit at a frequency of $\omega_b$, by the received optical pump signals directly converting the received optical photons at a frequency of $\omega_a + \omega_b$ into an entangled pair of optical photons at a frequency of $\omega_a$ and the 3D superconducting qubit at a frequency of $\omega_b$; and outputting the entangled pair via an optical output port to directly transfer quantum information between optical and microwave photons.

13. The method of claim 12, wherein the electro-optical material is in a shape of a circular disk and is configured to accommodate whispering gallery modes at multiple frequencies.

14. The method of claim 13, wherein the electro-optical material comprises Lithium Niobate.

15. The method of claim 12, further comprising receiving the entangled pair via a fiber optic line for further quantum processing of the entangled pair.

\* \* \* \* \*